(12) United States Patent
Mihelich et al.

(10) Patent No.: US 6,443,996 B1
(45) Date of Patent: *Sep. 3, 2002

(54) DECORATIVE DYE COLORANT FOR NATURAL STONE

(76) Inventors: Maurice W. Mihelich, 420 Lake Rd., Oconomowoc, WI (US) 53066; Diane M. Mihelich, 420 Lake Rd., Oconomowoc, WI (US) 53066

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,399

(22) Filed: Apr. 16, 1999

(51) Int. Cl.[7] .................. D06P 3/80; C04B 14/30
(52) U.S. Cl. ............... 8/522; 8/523; 8/582; 8/938; 106/31.05; 106/31.28; 106/400; 106/436; 106/456
(58) Field of Search .............. 8/521.3, 938, 582, 8/402; 106/401, 31.28, 31.03, 31.04, 31.05, 425, 436, 456

(56) References Cited

U.S. PATENT DOCUMENTS

| | | | | |
|---|---|---|---|---|
| 1,293,832 A | * | 2/1919 | McDonough |
| 1,812,734 A | * | 6/1931 | Bertolet |
| 2,047,426 A | * | 7/1936 | Miller |
| 3,079,209 A | * | 2/1963 | Boggus |
| 3,092,836 A | * | 6/1963 | Boggus |
| 3,607,358 A | * | 9/1971 | Dangl et al. |
| 3,698,234 A | * | 10/1972 | Allinikov |
| 4,010,293 A | * | 3/1977 | Davis |
| 4,661,393 A | * | 4/1987 | Uchiyama et al. |
| 4,695,487 A | | 9/1987 | Cho |
| 5,061,317 A | * | 10/1991 | Korpi et al. |
| 5,171,328 A | * | 12/1992 | Traugh et al. |
| 5,853,467 A | * | 12/1998 | Ostile |

OTHER PUBLICATIONS

Ullmann's Encyclopeia of Industrial Chemistry, fifth edition, ed Elvers and Hawkins vol. A28 p. 287, 1996.*

* cited by examiner

Primary Examiner—Margaret Einsmann
(74) Attorney, Agent, or Firm—Boyle Fredrickson Newholm Stein & Gratz S.C.

(57) ABSTRACT

A decorative dye colorant for use on various types of natural stone, such as granite, marble, limestone, and soapstone. The colorant is formed by mixing a solvent soluble dye with a suitable solvent, such as a ketone or an alcohol to form a dye solution. The solvent enables the dye to penetrate easily into the pores or openings located in the surface of the stone to color the stone so as not to mar the appearance of the surface of the stone. The dye is resistant to removal or discoloration, but may be removed by extended contact of certain chemicals with the dye. To permanently prevent the removal of the dye, a sealer is applied over the dye to prevent any such materials from contacting the dye. The sealer is comprised of an aliphatic urethane mixed with the alcohol xylol that also includes ultraviolet light resistant properties to prevent the dye from fading over time.

6 Claims, 1 Drawing Sheet

US 6,443,996 B1

DECORATIVE DYE COLORANT FOR NATURAL STONE

FIELD OF THE INVENTION

The present invention relates to colorants or dyes and, more specifically, to a decorative dye for use in various types of natural stone to alter the natural coloration of the stone.

BACKGROUND OF THE INVENTION

A number of types of natural stone are often used as construction materials in residential and commercial buildings. The stone provides an aesthetically pleasing appearance and very durable component to the buildings in which it is used.

However, as the color of these types of stone varies depending upon the location of the quarry from which the stone is taken, and as most of these quarries are located abroad, once the desired color is selected, there usually is a large expense incurred by having the stone shipped to the construction site. Therefore, before choosing to utilize stone as a building material in the residential or commercial structure, the purchaser will normally make certain that the stone selected for the task exactly meets the specifications necessary for the shape, color, and quality of the stone.

The marble, granite, limestone, soapstone, and other types of natural stone utilized for this purpose have been formed in the earth over a period of many years. The formation process compresses many different mineral components together to form the stone and gives the stone a unique color pattern that varies even within the stone. In most applications, due to the shape necessary for the specific construction application, the stone will need to be cut and shaped to fit the application. When the stone is cut, the coloration of adjacent pieces of the stone may not exactly match one another due to the unique color pattern throughout the stone. Therefore, the stone may not fully present the desired aesthetically pleasing effect desired due to the variations in the coloration of adjacent pieces of the stone.

In this situation, the purchaser is normally forced to accept the color variations in the stone. Thus, purchasing natural stone for use as a decorative feature for a building entails a certain amount of risk regarding the appearance of the stone when the construction of the building is completed.

In the past, a number of processes have been used to attempt to lessen or modify color variations in different types of natural stone, thereby to make stone more desirable as a building material. One prior art process used to modify variations in the color of naturally-formed stone is to treat the stone under pressure with a mixture of an inorganic or organic pigment dissolved in a solvent. The pigment is applied to the surface of the stone and the pressure exerted on the dissolved pigment and the stone forces the pigment and solvent mixture deeply into the surface voids in the stone to provide a uniform color to the stone. However, the pigment used in this process is easily decomposed by heat or sunlight, and is also easily leached out of the surface voids by water.

An alternative process used for this purpose is one in which the stone is subjected to a very high temperature to expand the surface voids in the stone. A pigment is then applied to the heated stone. The pigment can more easily penetrate into the expanded voids. However, this process also is not very suitable for correcting color variations within the stone, as, due to the heat to which the stone was subjected, certain inherent properties of the stone are detrimentally affected. For example, the natural color of the stone deteriorates. Furthermore, certain physical properties, such as weather resistance, water resistance, and impact resistance, are also negatively affected.

Still another attempt to provide a suitable natural stone coloration process involved a process whereby a pigment blended with a thermosetting resin solution is impregnated into the voids in the stone. However, in this process, the pigment does not penetrate well into the stone, and provides only a surface coating that mars the natural beauty and smoothness of the polished surface of the stone.

A more recent process developed for the coloration of granite is disclosed in Cho, U.S. Pat. No. 4,695,487. In this patent, a pigment for coloring granite is formed by reacting a metal with a strong acid to obtain a metallic salt of the desired color for the granite. The metallic salt is then dissolved in a suitable solvent mixed with a small amount of a surfactant to allow the pigment to permeate into the surface voids and cracks within the granite. The granite and pigment solution are placed within a vacuum container that draws the pigment into the voids within the granite. Upon completion of the permeation of the pigment into the granite, the granite is then heated in a furnace under oxidizing atmospheric conditions to a temperature of between 250–300° C. for 2–3 hours to increase the formation of metallic oxides within the numerous voids and cracks in the granite. The metallic oxides formed in the voids and cracks provide the desired color to the granite. Finally, to protect the newly formed metallic oxides within the granite, the granite is surface treated with a silicone oil to protect the metallic oxides formed within the voids, preventing the deterioration or removal of the metallic oxides.

While providing a reliable method for modifying color variations in granite, the method of the Cho patent does have significant shortcomings. First, the granite must be heated to very high temperatures in order for the process to be effective. In addition to being a very difficult and time consuming step, the step of heating the granite also greatly increases the cost of using the granite for decorative purposes. Second, as stated in the Cho patent, the process only works for granite, and not other types of porous stone, such as marble, limestone, and soapstone, which are also highly sought after types of decorative stone. Lastly, though the granite is treated with a silicone oil to prevent the deterioration of the color generated by the metal oxides formed by the process, should the oil layer fail for any reason, for example, if the stone become chipped or scratched, the colored metal oxides will quickly deteriorate and detract from the appearance of the colored, treated granite.

Because of the shortcomings of the prior art processes for coloring certain types of natural stones, there is a need for a colorant and process for coloring natural stone that is capable of permanently coloring the stone in an easy and cost effective manner without affecting any of the desired natural properties of the stone.

SUMMARY OF THE INVENTION

The present invention comprises a decorative dye colorant used to permanently or semi-permanently modify the color of various types of natural stone to provide aesthetically pleasing construction materials.

The dye colorant is able to inexpensively alter the color without affecting either the polished surface of the stone or any of the other inherent qualities of the stone.

The colorant includes a dye capable of matching or blending with the colors of natural stones. The dye used in the application is a powdered, solvent soluble dye that comes in a variety of colors. Specific amounts of the different color dyes available may be mixed to create the desired shade for the colorant used on the stone.

When mixed to the desired shade, the dye is dissolved in one of a number of suitable solvents to place the dye in a liquid form that may easily be applied to a polished natural stone surface. The solvents which may be used to dissolve the dye include a number of alcohols and ketones. Each effectively disperses the powered dye in the solvent, which acts as a carrier for the dye and allows the dye to easily penetrate into the pores in the stone surface. Once dissolved in the chosen solvent, the dissolved dye may also have a whitening pigment added to lighten the color of the dye as desired.

After being formed by mixing the dye with the solvent, the colorant may be applied to a polished surface of a natural stone in any conventional manner, similar to applying paint. When applied to the stone, the dissolved dye is carried by the solvent into the pores of the stone so that the dye, when the solvent is allowed to dry or evaporate out of the pores in the stone, sets within the pores beneath the polished surface of the stone.

After drying in the pores on the stone, the colorant becomes highly resistant to a variety of different substances. However, in this form, the colorant is not permanent and may be removed over time by extended contact with certain substances, such as bleach. This allows an individual to remove and change the color of the stone if desired. Also, if it is desired to permanently color the stone, a sealer can be applied to the surface of the stone over the colorant. The sealer also penetrates into pores of the stone and sets beneath the polished surface to provide an impervious layer between the polished surface and the colorant that prevents any staining or discoloration of the colorant.. The sealer can be applied to the.,.stone in any conventional manner, similar to the application of the dissolved dye.

DETAILED DESCRIPTION OF THE INVENTION

Figure 1:
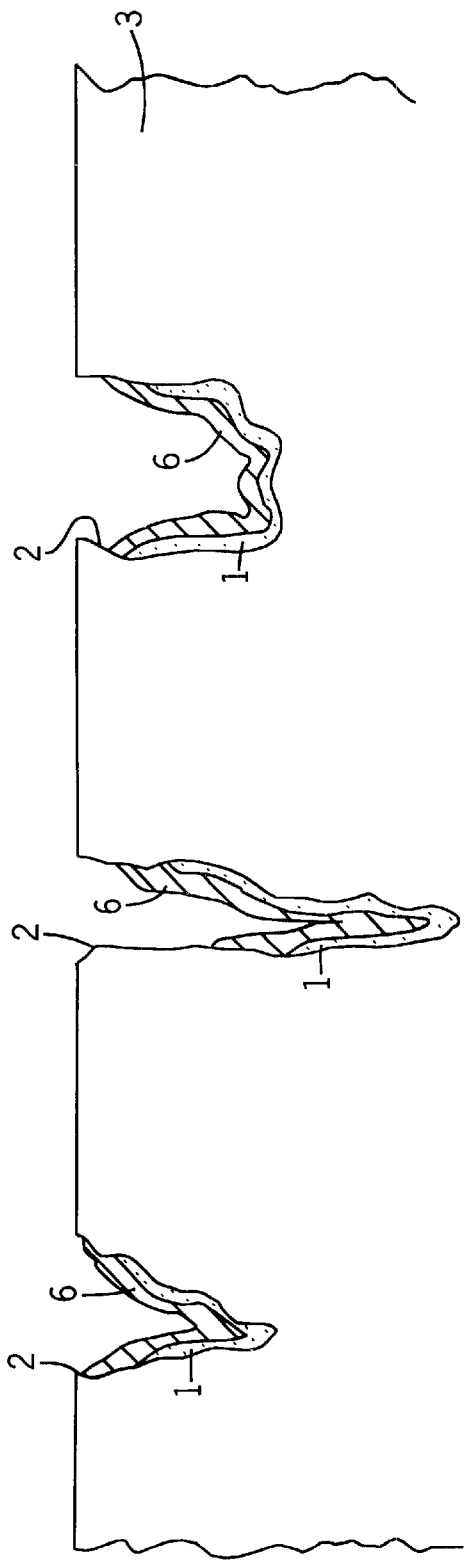
FIG. 1 is an enlarged cross-sectional view of the pores in a piece of stone containing the dye colorant of the present invention.

FIG. 1 illustrates the decorative dye colorant 1 of the present invention as applied within pores 2 of a piece of porous natural stone 3. The decorative dye colorant 1 is used to modify color variations in different types of natural stones 3, or to change the overall color of such stones. The types of natural stone 3 on which the dye may be used include marble, granite, limestone, soapstone, and any other type of natural stone that includes a number of openings or pores 2 in the stone into which the colorant 1 may penetrate. As these types of natural stone are commonly used as building materials, the colorant is highly useful in producing pieces of natural stone used for these purposes that have the desired color characteristics.

With respect to the solvent soluble dyes which are suitable for the compositions of this invention are those which are known to persons skilled in the art as solvent dyes, as indicated in the Colour Index as published by the Society of Dyers and Colourists (Great Britain) and by the American Association of Textile Chemists and Colorists. This invention applies to dyes in this class which are soluble in alcohol and ketone solvents. More specifically, the dye utilized in the present invention is a powdered solvent soluble dye manufactured under the trade name Orasol® by Ciba-Geigy. The dye is normally used as a transparent colorant for a variety of coatings, such as printing inks, lacquers, enamels, decorative coatings, and wood stains. The dye colors available can be mixed with one another in various proportions and combinations to form a much greater number of colors and shades as desired. Some examples of the types of colors and/or shades of color that can be achieved by mixing different colored dyes of this type together are as follows:

EXAMPLE 1

Royal Blue:

24 parts blue+6 parts black+3 parts red

EXAMPLE 2

Peach:

1 part yellow+1 part orange

EXAMPLE 3

Mustard Yellow:

32 parts yellow+1 part black+1 part orange+1 part brown

As the dye is originally in powdered form, the dye must first be dissolved in a suitable solvent before application to the stone. The types of solvents that may be used to dissolve the dye include alcohols, ketones, and esters. For the decorative dye application of the present invention, the preferred dye solvents are pure acetone and butyl salicylate mixed with water in a 1:3 ratio. The powdered dye dissolves completely in the solvent to form an easily applied liquid dye solution.

While the amount of solvent added to a given amount of powdered dye may vary depending upon the specifications for the color intensity and shade of the dye on the stone, as well as the interaction of the dye with the natural color of the particles forming the stone, the preferred ratio of dye to solvent per square foot of stone to be treated is approximately 5 mL of powdered dye per 30 mL of solvent. This ratio provides enough dye to generate a roughly even color over the surface of the stone. Consequently, it follows that a reduction in the amount of dye will lessen the intensity of the color and an increase in the amount of dye will add to the intensity of the color.

The color of the dye may also be altered through the addition of a metallic pigment to the dissolved dye to lighten or add white flecks to the dye, if desired. The metallic pigment used for this purpose comprises finely granulated particles of certain metal oxides ranging in size from 20 to 40 nm with an average size of 25 nm. Some of the metal oxides available for use as the pigment include aluminum oxide, iron oxide, copper oxide, zinc oxide and titanium oxide. When added to the dye solution in which the powdered dye is dissolved in butyl salicylate and water, the pigment can be added directly to the solution. However, when acetone is the solvent used to dissolve the powdered dye, the metal oxide particles must be coated in order to prevent the particles from agglomerating and settling out in the dye solution. The pigments, in both coated and uncoated form, are commercially sold under the trade name NanoTek by Nanophase Technologies Corporation of Burr Ridge, Ill.

To give the exposed, smooth surface of the stone the desired color, the dye solution is applied to a smooth, polished surface of the stone. The solvent carries the colorant in the solution beneath the smooth polished surface of the stone into the pores, preventing the colorant from detrimentally affecting the finish and appearance of the polished surface. The dye solution then dries on the stone such that the solvent evaporates out of the pores, with the dye remaining within the pores.

When properly applied within the pores of the stone, the colorant provides a relatively durable and long-lasting decorative color to the stone surface that is highly resistant to discoloration or removal by a variety of substances. Nevertheless, certain types of materials are capable of removing the colorant if left on the stone in contact with the colorant for an extended period of time. One example of such a material is liquid bleach. Thus, the colorant of the present invention allows the color of the stone be removed and changed if desired by applying bleach, or a similar agent to the colored stone.

However, should the individual want the color to remain permanently in the stone, to prevent the dye from being removed from the stone by these types of substances, the application may include a sealer 6 applied to the polished, smooth surface of the stone after the colorant has dried. After application, the sealer dries and provides a permanent protective layer over the dye within the pores to prevent any substances from contacting and removing or discoloring the dye. The sealer also provides protection from ultraviolet light to prevent the color of the dye from fading over time. The preferred sealer utilized in the present invention is Chemseal 1175-UVR sold by Parker Coatings, Inc. of Green Bay, Wis. Chemseal 1175-UVR is an aliphatic urethane sealer that is normally used as a sealer for concrete, metal surfaces, and wood surfaces. The sealer may be applied to the polished, smooth surface of the stone in a manner similar to the application of the dye solution. Multiple coats of the sealer are normally applied to the stone surface to insure that the sealant penetrates into all of the openings in the stone surface into which the dye is disposed. Furthermore, in order to enhance the ability of the sealer to penetrate into the openings in the stone, the sealer is preferably mixed in a 3:1 ratio with the alcohol, xylol.

To test the resistance properties of the colorant when used on natural stone, three pieces of different types and colors of stone were treated with the colorant including the sealer. After the colorant had dried, the stone pieces were subjected to testing in which each of the following chemicals and materials were placed on the treated stone pieces for a period of 24 hours. The chemicals or materials utilized in the tests included:

Liquid Bleach
Finger Nail Polish Remover
Liquid Shoe Polish (Black)
Orange Juice
Concentrated Lemon Juice
MEK (Methylethyl Ketone)
Liquid Red Iodine
Yellow Mustard
Isopropyl Alcohol
Red Lipstick
30 Weight Motor Oil
Black Dye Marker ("Magic Marker")
Wine
Ketchup
Coffee At the end of the twenty-four (24) hour period, the chemical or material was completely cleaned off of the stone piece. The stone was then examined to determine any change in the color of the colorant on the stone. In each case, the chemical or material placed on each stone piece did not affect the color or intensity of the colorant in any visual or textural manner, thus exhibiting the resistance of the colorant to changes in appearance.

To apply the colorant 1 to a porous piece of natural stone 3, first the specific color of the dye to be applied to the stone must be selected. Once the color has been created by mixing different amounts of the colors of powdered dye with one another, the solvent used to form the dye application 1 is then added to the powdered dye 4 to form the dye solution colorant. It is important to add the solvent to the dye, rather than vice versa, as the dye will not dissolve entirely in the solvent when added to the solvent, but will clump and settle to the bottom of the container in which the powdered dye and solvent are mixed.

Once the dye solution has been made, the dye solution may be applied to the polished surface of the stone 3. This is accomplished by taking a paint brush, cloth, or similar item, dipping the brush into the dye solution to soak up a portion of the solution, and spreading the dye solution onto the polished surface of the stone with the brush. This allows the dye solution to penetrate into the pores 2 located on the surface of the stone 3. The dye solution is applied in this manner until the desired color for the stone is achieved. The dye solution is applied at room temperature. The dye solution is then allowed to dry on the stone, such that the solvent evaporates entirely out of the pores in the stone, leaving the dye within the pores 3. Depending upon the type of solvent used, for example, acetone dries faster than butyl salicylate, the dye solution is allowed to dry on the surface of the stone for a period of between 10 and 20 minutes. After the solution has dried, any excess dye remaining on the exterior surface of the stone is removed by rubbing the stone with a clean cloth treated with acetone.

After all of the excess dye solution colorant has been removed from the stone, the sealer 5 may be applied to the surface of the stone in the same manner as the dye solution. The sealer is then allowed to set or dry within the pores in the stone. Multiple coats of the sealer may be applied in order to insure that the sealer penetrates into each and every pore in the stone to cover the colorant residing within the pores. Depending on the chemical composition of the sealer and the number of coats applied to the stone, after the sealer application is completed, the sealer is allowed to dry on the stone for a period of about four (4) hours. Any excess sealer remaining on the surface of the stone is removed by rubbing the surface with steel wool. Depending upon the type of stone to which the dye application is applied, the grain of the steel wool will vary, from a fine grain for a harder stone such as granite, to a very fine grain for softer stone such as marble and limestone.

Furthermore, the sealer may be removed from the stone if necessary by using a conventional marine stripper containing trichloroethane. This kind of stripper normally comes in gel form and is applied to the stone surface by rubbing the gel onto the surface such that the stripper contacts the sealer within the pores. After allowing the stripper sufficient time to interact with and break the chemical bonds formed by the sealer, typically about 20 minutes, the stripper is wiped off of the stone surface using a clean cloth. This allows the dye application on the piece of stone to be removed or changed, even after the sealer has been applied to the surface of the stone.

We claim:

1. A decorative colorant applied to various types of natural stone comprising:
   a powdered, solvent soluble dye; and
   a solvent mixed with the dye to dissolve and function as a carrier for the dye, enabling the dye to penetrate into the pores in the natural stone below a polished surface of the stone,
   wherein the solvent is butyl salicylate and water.

2. A decorative colorant applied to various types of natural stone comprising:
   a powdered, solvent soluble dye; and
   a solvent mixed with the dye to dissolve and function as a carrier for the dye, enabling the dye to penetrate into the pores in the natural stone below a polished surface of the stone,
   wherein the solvent is butyl salicylate.

3. The colorant of claim 2 further comprising a pigment.

4. The colorant of claim 3 wherein the pigment is a metallic pigment.

5. The colorant of claim 4 wherein the metallic pigment is comprised of particles of a metal oxide.

6. The colorant of claim 5 wherein the metal oxide is selected from the group consisting of aluminum oxide, zinc oxide, copper oxide, iron oxide, and titanium oxide.

* * * * *